United States Patent [19]

Fuchs et al.

[11] 4,372,892
[45] Feb. 8, 1983

[54] PROCESS FOR THE PREPARATION OF 1-AMINOBENZENE-5-β-SULFATOETHYL-SULFONE-2,4-DISULFONIC ACID, THE 5-VINYLSULFONE COMPOUND AND THE ALKALI SALTS THEREOF

[75] Inventors: Hermann Fuchs, Kelkheim; Gustav Kapaun, Neuenhain; Fritz Meininger, Frankfurt am Main, all of Fed. Rep. of Germany

[73] Assignee: Hoechst Aktiengesellschaft, Frankfurt am Main, Fed. Rep. of Germany

[21] Appl. No.: 276,807

[22] Filed: Jun. 24, 1981

Related U.S. Application Data

[60] Continuation of Ser. No. 127,790, Mar. 5, 1980, abandoned, which is a division of Ser. No. 703,530, Jul. 8, 1976, abandoned, which is a continuation-in-part of Ser. No. 514,921, Oct. 15, 1974, abandoned.

[30] Foreign Application Priority Data

Oct. 17, 1973 [DE] Fed. Rep. of Germany ....... 2352058

[51] Int. Cl.$^3$ .................. C07C 141/00; C07C 143/58
[52] U.S. Cl. ................................ 260/458 C; 260/508
[58] Field of Search ........................... 260/458 C, 508

[56] References Cited

U.S. PATENT DOCUMENTS 3,859,271  1/1975  Sugiyama et al. ............. 260/458 C
3,900,510  8/1975  Fuchs et al. .................... 260/458 C

*Primary Examiner*—Nicky Chan
*Attorney, Agent, or Firm*—Curtis, Morris & Safford

[57] ABSTRACT

New compounds had been found which correspond to the formula

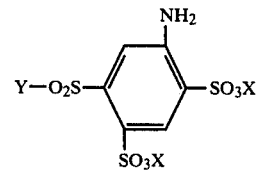

as well as processes for preparing them by sulfonation of 3β-sulfato- or 3-β-hydroxyethylsulfonyl - aminobenzene. The novel compounds are valuable intermediary products for the preparation of azo fibre-reactive dyestuffs which have very good dyeing properties and a high fibre-reactivity yielding dyeings of excellent fastnesses, especially to light and wet processing.

2 Claims, No Drawings

PROCESS FOR THE PREPARATION OF 1-AMINOBENZENE-5-β-SULFATOETHYLSULFONE-2,4-DISULFONIC ACID, THE 5-VINYLSULFONE COMPOUND AND THE ALKALI SALTS THEREOF

This is a continuation, of copending application Ser. No. 127,790 filed Mar. 5, 1980, now abandoned.

The present invention relates to novel compounds of the general formula (1)

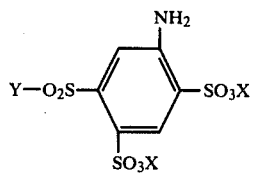

Wherein Y is one of the groups of the formulae $$XO_3S-O-CH_2-CH_2- \quad (2)$$

or $$CH_2=CH- \quad (3)$$

and X is a hydrogen, alkali metal or alkaline earth metal ion, especially a sodium, potassium or calcium atom, and a process for preparing them with good yields, wherein 1-amino-benzene-3-β-sulfatoethyl-sulfone or 1-amino-benzene-3-β-hydroxyethyl-sulfone either (a) is dissolved or suspended in anhydrous sulfuric acid (monohydrate) between about −15° C. and +40° C., preferably between about 10° C. and 20° C., to which subsequently sulfur trioxide, dissolved in anhydrous sulfuric acid, preferably a sulfuric acid/sulfur trioxide mixture having a mixture ratio of 30:70 to 90:10 is added in the temperature range mentioned above, or (b) is introduced immediately into a mixture of sulfuric acid/sulfur trioxide having a content of up to 30 percent by weight of sulfur trioxide, and subsequently heated to about 100° C. to about 150° C., preferably 125° C.–135° C. and wherein if desired, the 1-aminobenzene-5-β-sulfato-ethylsulfone-2,4-disulfonic acid formed or the salt thereof is heated in an aqueous solution at 2.5 to 7, preferably at 4° to to about 30° C. to about 60° C., the sulfuric acid which has been split off in the aqueous solution, is neutralized by the addition of an acid-binding agent, and the 1-amino-benzene-5-vinylsulfone-2,4-disulfonic acid is isolated in the form of the alkali metal or alkaline earth metal salt.

The molar ratio of the compound to be sulfonated, to the free sulfur trioxide of the reaction mixture is at about 1:2.5 to 1.6, preferably at 1:2.7 to 1:4. To convert the β-hydroxy-ethyl group into the β-sulfatoethyl group, one mol of sulfur trioxide is additionally required so that the ratio is 1:3.5 to 1.7, preferably 1:3.7 to 1:5.

To isolate the 1-aminobenzene-5-β-sulfatoethylsulfone-2,4-disulfonic acid in the form of the free acid, obtained after the disulfonation in a sulfuric acid/sulfur trioxide mixture, the sulfonation mixture is introduced, while stirring, into a mixture of ice and potassium chloride, whereby the disulfonic acid mentioned is precipitated in form of the free acid and may be filtered.

To isolate the 1-aminobenzene-5-β-sulfatoethylsulfone-2,4-disulfonic acid in form of a salt the sulfonation mixture is poured onto ice and the sulfuric acid in excess is neutralized with an alkali metal hydroxide or carbonate or with an alkaline earth metal hydroxide or carbonate. After filtering the precipitations of alkali metal or alkaline earth metal sulfate the disulfonic acid mentioned may be obtained in the form of the alkali metal salt or alkaline earth metal salt, for example of the sodium or potassium salt, by spray drying.

The yield of 1-aminobenzene-5-β-sulfatoethylsulfone-2,4-disulfonic acid is 70 to 90% of the theory, calculated on the free acid.

To isolate the 1-aminobenzene-5-vinylsulfone-2,4-disulfonic acid in form of a salt the procedure may be the following one: the sulfuric acid split off during the preceding heating of the 1-aminobenzene-5-β-sulfatoethylsulfone-2,4-disulfonic acid may be neutralized by the addition of an acid-binding agent, for example an alkali metal or alkaline earth metal hydroxide or carbonate, preferably sodium hydroxide or sodium carbonate, and the alkali metal or alkaline earth metal salt, for example the sodium salt, may be obtained by spray-drying the neutral solution. The alkali metal salts of the compounds mentioned may also be isolated by precipitating the 1-aminobenzene-5-vinyl-sulfone-2,4-disulfonic acid from the solution obtained by means of alkali halides.

The duration of disulfonation, i.e. the treatment of the starting products in a mixture of sulfuric acid/sulfur trioxide may be between one hour and about 20 hours.

The 1-aminobenzene-5-β-sulfatoethylsulfone-2,4-disulfonic acid, 1-amino-benzene-5-vinylsulfone-2,4-disulfonic acid and the alkali salts thereof are novel, valuable diazo components for the preparation of valuable azo dyestuffs.

Such azo dyestuffs prepared with coupling components usual in the preparation of azo dyestuffs and the novel amino compounds of the invention, have a good solubility in water, and with regard to dyestuffs prepared with 1-amino-benzene-3-β-sulfatoethyl-sulfone which is the preliminary product for the sulfonation reaction described above, as diazo component, they are distinguished by a strongly bathochrome shifting of the shade.

By this way dyestuffs can be prepared having color shades which otherwise can be obtained only with difficulty.

Dyestuffs on the basis of these novel preliminary products can be thermofixed on cellulose fibre materials. Activated by the sulfonic acid groups in o- or p-position the vinylsulfone group, as compared with the vinylsulfone group or β-sulfatoethyl-sulfone group of known dyestuffs, shows a considerably increased reactivity. In the cold dwell and short dwell process for the printing and dyeing of natural and regenerated cellulose fibres a considerably reduced fixation time is observed. In the case of low temperature processes for dyeing wool, for example at a dyeing temperature of 80° C., already the best possible fixation on the fibre is obtained, whereas the known comparable vinylsulfone dyestuffs show their best fixation values only at a temperature of from 95° to 100° C. within the dyeing period prescribed in the dyeing process. Furthermore, these novel dyestuffs have an excellent levelling and penetrating capacity as well as the capacity of being combined with one another and with other dyestuffs, and they yield dyeings having an excellent fastness to wetting and to light.

Suitable coupling components, which, after combination with the diazo components of the invention yield valuable azo dyestuffs are for example 2-amino-8-naphthol-6-sulfonic acid, N-ethyl-N-β-cyanethyl-m-toluidine and 2-naphthylamine-5-sulfonic acid.

With regard to the preparation of a valuable azo dyestuff from an amine (diazo component) of the invention and a coupling component and the properties of the dyestuff obtained the following Example may be mentioned:

0.1 Mol of 1-aminobenzene-5-vinylsulfone-2,4-disulfonic acid is dissolved in 150 ml of water, mixed with 50 g of ice and 25 g of a 37% hydrochloric acid and diazotized, while stirring, by adding dropwise 20 ml of a 5 N-sodium nitrite solution. After 15 minutes the small excess of nitrous acid is destroyed with a small amount of amidosulfonic acid. The diazonium salt is partly precipitated. 0.1 Mol of 2-naphthylamino-5-sulfonic acid is introduced into this suspension. The pH-value is adjusted to 2.5–3.0 by addition of sodium carbonate. When coupling is finished the mixture is neutralized with calcinated sodium carbonate to a pH-value of 5.5 to 6.5, and the dyestuff is salted out with a 28% sodium chloride at 0° to 5° C. After filtering and drying a dark red powder is obtained which yields on wool from a bath containing a small amount of acetic acid and heated to 80° C., a very good red dyeing fast to wetting and to light. When dyeing cotton according to a pad-short dwell process in the presence of an alkaline agent, a completely developed dyeing having a good fastness to light and a very good fastness to wetting is obtained after about 1 to 5 minutes.

The dyestuff thus obtained corresponds in form of the free acid to the formula

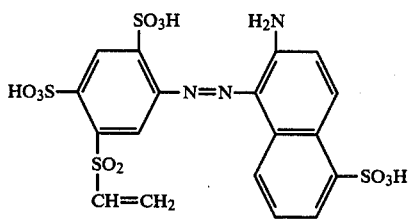

The following Examples illustrate the invention.

EXAMPLE 1

281 g (1 mol) of 1-aminobenzene-3-β-sulfatoethylsulfone were introduced portionwise, while cooling and stirring and with exclusion of humidity, into 843 g of sulfuric acid monohydrate at 15° to 20° C. After stirring for 60 minutes, 350 g of oleum having a content of $SO_3$ of 65 percent by weight were slowly added dropwise, whereby the temperature was maintained at 15° C. to 20° C. by cooling from the outside. Subsequently the mixture was heated for 12 hours to 130° C. The cooled reaction mixture was then introduced, while stirring, into a mixture of ice and potassium chloride, whereby the 1-aminobenzene-5-β-sulfatoethylsulfone-2,4-disulfonic acid of the formula

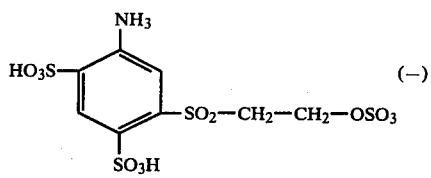

was precipitated. It was filtered and dried. The yield was 75% of the theory.

The analysis showed a ratio of carbon to sulfur of 2:1 corresponding to the formula $C_8H_{11}NO_{12}S_4$. The two protons being in a para-position in the benzene nucleus could be determined in the nuclear resonance spectrum of NMR spectroscopy.

EXAMPLE 2

281 g (1 mol) of 1-aminobenzene-3-β-sulfatoethyl-sulfone were introduced portionwise, while cooling and stirring and with exclusion of humidity, into 1193 g of oleum having a content of $SO_3$ of 19 percent by weight at 15° to 20° C. After stirring for 60 minutes the mixture was heated for 12 hours to 130° C. The reaction mixture obtained was then introduced, while stirring, into a mixture of ice and potassium chloride, whereby the 1-aminobenzene-5-β-sulfatoethylsulfone-2,4-disulfonic acid of the formula

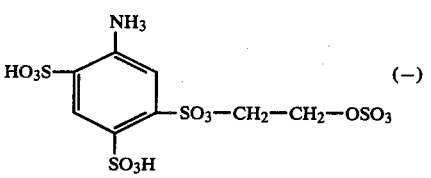

was precipitated. It was filtered and dried. The yield of 1-aminobenzene-5-β-sulfatoethyl-sulfone-2,4-disulfonic acid was 70% of the theory.

EXAMPLE 3

201 g (1 mol) of 1-aminobenzene-3-β-hydroxyethyl-sulfone were introduced portionwise, while cooling and stirring and with exclusion of humidity, into 723 g of sulfuric acid monohydrate at 15° to 20° C. Stirring was continued for 3 hours and then 473 g of oleum having a content of $SO_3$ of 65 percent by weight were slowly added dropwise, whereby the temperature was maintained at 15° to 20° C. by cooling from the outside. Then the mixture was heated for 12 hours to 130° C. The cooled reaction mixture was introduced, while stirring, into a mixture of ice and potassium chloride, whereby the 1-aminobenzene-5-β-sulfatoethylsulfone-2,4-disulfonic acid of the formula

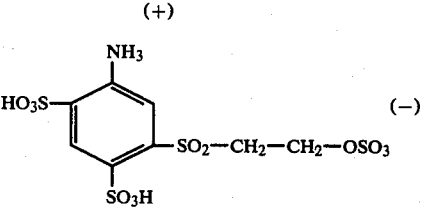

precipitated. It was filtered and dried. The yield was 75% of the theory.

EXAMPLE 4

441 g (1 mol) of 1-aminobenzene-5-β-sulfatoethylsulfone-2,4-disulfonic acid were introduced into 1500 ml of water at pH 6 to 7. Then the mixture was adjusted to pH 6 to 7 with sodium carbonate and heated to 50°–60° C. The sulfuric acid splitting off was neutralized by further addition of sodium carbonate. After 10 minutes the reaction was finished. The disodium salt of the 1-aminobenzene-5-vinylsulfone-2,4-disulfonic acid was obtained by spray drying the neutral solution.

The analysis of the novel compound showed a ratio of carbon to sulfur of 8:3 corresponding to the molecular formula $C_8H_7NO_8S_3Na_2$. The signals of the vinyl protons in the NMR spectrum were in the range of $\delta = 6.0$ to 6.4.

We claim:

1. A process for preparing a compound of the formula

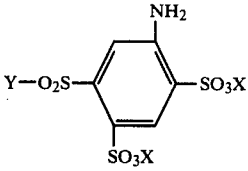

wherein Y is $XO_3S-O-CH_2-CH_2-$ and X is hydrogen which comprises:

dissolving or suspending 1-aminobenzene-3-β-sulfatoethylsulfone or 1-aminobenzene-3-β-hydroxyethylsulfone in anhydrous sulfuric acid (monohydrate) at a temperature between about −15° C. and about +40° C. and subsequently adding to it a sulfuric acid/sulfur trioxide mixture having a mixture ratio of 30:70 to 90:10, in the temperature range indicated above, the amount of sulfur trioxide being such that the molar ratio of the starting aminobenzene compound to sulfur trioxide is about 1:2.5 to 1:6 where it contains the β-sulfatoethylsulfonyl group, or is about 1:3.5 to 1:7 where it contains the β-hydroxyethylsulfonyl group, and subsequently heating to a temperature of from about 100° to about 150° C.

2. The process according to claim 1 in which the 1-amino-benzene-5-β-sulfatoethylsulfone-2,4-disulfonic acid formed is heated in an aqueous solution at a pH of from 2.5 to 7 to about 30° C. to about 60° C. to prepare the 1-amino-benzene-5-vinylsulfone-2,4-disulfonic acid or its alkali metal or alkaline earth metal salt.

* * * * *